United States Patent Office 3,322,506
Patented May 30, 1967

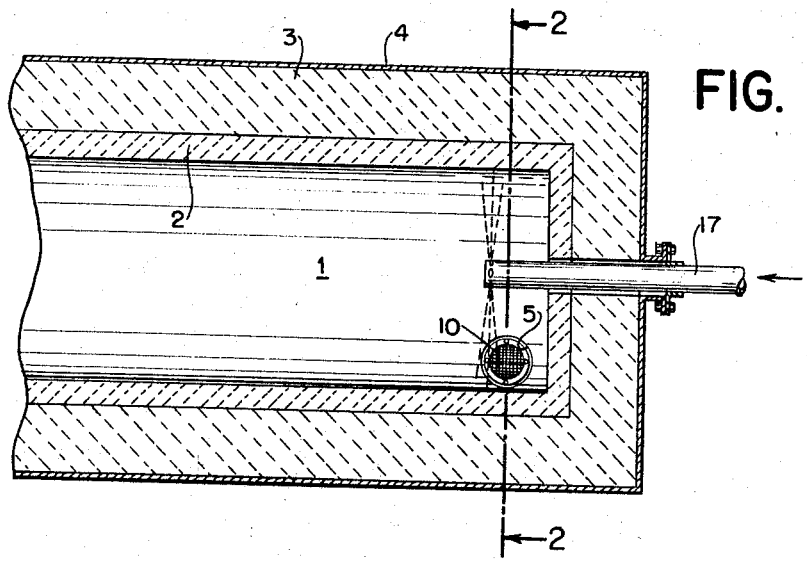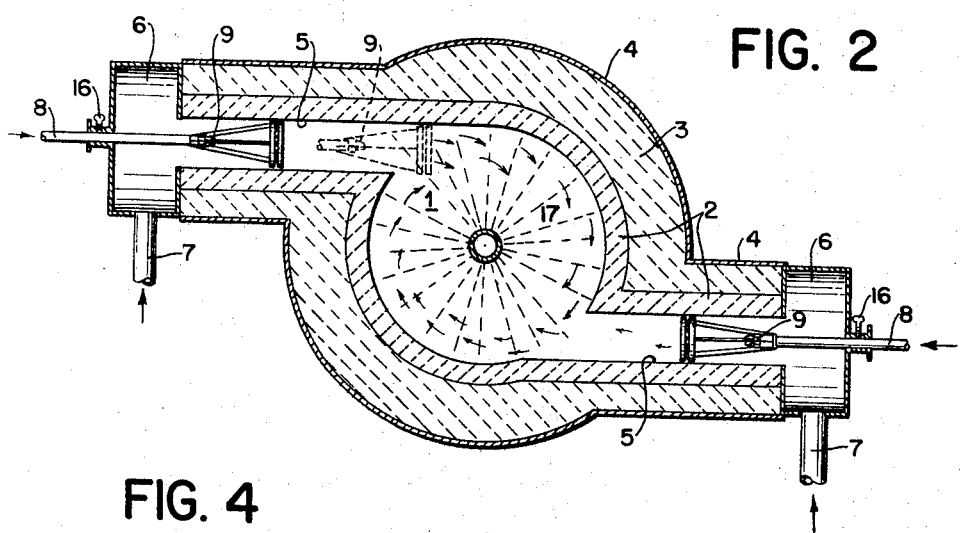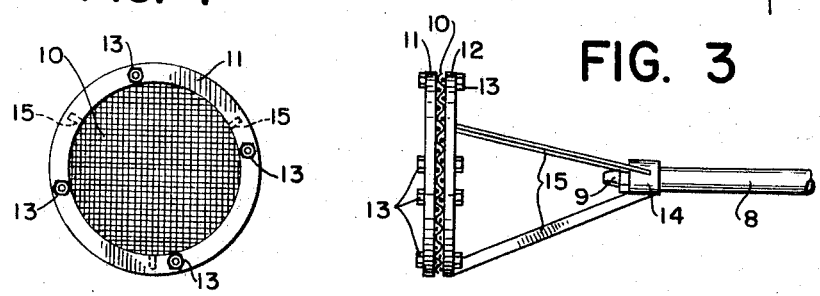

3,322,506
CARBON BLACK APPARATUS
Albert L. Wempe, Franklin, La., and Earl J. Estopinal, Jr., Conroe, Tex., assignors to Columbian Carbon Company, New York, N.Y., a corporation of Delaware
Filed Mar. 19, 1963, Ser. No. 266,235
8 Claims. (Cl. 23—259.5)

This invention relates to the manufacture of furnace carbon blacks by the thermal decomposition of fluid hydrocarbons and provides improvements in furnace black processes of the type in which a stream of hot combustion gases, at a temperature in excess of the decomposition temperature of the hydrocarbons, is established and maintained within a furnace chamber by burning a combustible mixture of a fluid fuel and an oxidizing gas, e.g., air, and the hydracarbon to be decomposed, hereinafter referred to as "hydrocarbon make," is separately injected into, and dispersed in, the hot gases and decomposed by heat absorbed therefrom to form carbon black in gaseous suspension from which it is subsequently separated and collected. Carbon black furnace processes of this type are well-known and are described, for instance, in the Heller U.S. Patents 2,782,101 and 2,768,067 and the Norris et al. U.S. Patent 2,985,511.

The invention relates more particularly to improvements in the method of, and means for, generating the hot combustion gases whereby the operation of the process and apparatus, as a whole, is materially improved and a nicer control of the process and characteristics of the resultant product are made possible.

In the processes specifically described in said patents, separate streams of a combustible mixture of a fluid hydrocarbon fuel and air are formed in a multiplicity of mixing conduits leading into one end of a cylindrical reaction chamber and so positioned with respect thereto that the combustible mixture is injected tangentially into the chamber and is burned therein to form within the chamber a helically flowing stream of hot combustion gases into which the hydrocarbon make is injected radially. The invention is also applicable to processes of that general type in which the hydrocarbon make is injected axially into the helically flowing, hot gas stream. It is also applicable to processes in which he fluid fuel and oxidizing gas are mixed in combustion tunnels and burned therein and the resultant combustion products injected tangentially into a cylindrical reaction chamber, as described for instance in the Heller U.S. Patent 2,918,353.

In all such operations, there is a greater or less degree of mixing of the fluid fuel and oxidizing gas prior to ignition. But we have found that the mixing is frequently inadequate for the generation upon burning, of combustion gases of uniform and readily controllable composition.

We have found that a thorough mixing of the fluid fuel and the oxidizing gas, prior to the burning of the mixture to form the hot combustion gases within the furnace chamber, is of extreme importance both with respect to yield and control of quality of the furnace black product and with respect to smooth furnace operation. Incomplete mixing tends to retard combustion and, if combustion of the fuel is too slow or is incomplete, excessive amounts of unreacted oxygen may be present in the combustion gases when the hydrocarbon make is commingled therewith, which tends to reduce the carbon black yield due to the reaction of the hydrocarbon make with the excess oxygen present in the hot combustion gases. Also, it is known that the surface chemistry of furnace carbon blacks so produced is decidedly influenced by the composition of the hot blast flame gases in which the hydrocarbon make is dispersed. The present invention provides a method and means by which these conditions may be more nicely controlled.

Also, it has been observed that inadequate mixing of the fluid fuel and the oxidizing gas tends to promote detonation of the combustible mixture, rather than smooth burning, and a series of small explosions is apt to result causing vibration and damage to the refractory lining of the furnace. This may detrimentally affect the quality of the carbon black produced, due to contamination with refractory material and may render the furnace inoperable. Furthermore, poor combustion of the hydrocarbon fuel, due to inadequate mixing with the oxidizing gas, tends to cause coke to form on the furnace walls which eventually disrupts he carbon black production operation.

It is a primary purpose of the invention to increase the yield and quality control of the furnace black produced. This purpose is accomplished by our present invention, along with other marked advantages, including elimination or reduction of coke formation on the walls of the furnace chamber, an increase in the permissible range of proportions of oxidizing gas for effective burning of the combustible mixture and a smoother stabilized combustion resulting in greater uniformity and control of the characteristics and composition of the hot gas stream in which the carbon black is formed. The invention is applicable to all furnace black operations of the type here in described.

These and other advantages are obtained, in accordance with the present invention, by causing a preliminarily formed mixture of the fluid fuel and the oxidizing gas, produced by conventional methods, such, for instance, as disclosed in the previously noted patents, to pass through a fine grid, for instance a grid of relatively fine-mesh screen wire, whereby the fuel and oxidizing gas are thoroughly mixed, prior to the burning of the mixture. In lieu of metal screening, a perforated plate, in which there is a multiplicity of relatively small, closely spaced apertures, may be used. The apertures extending through the grid are advantageously uniformly spaced over the entire area of the grid but are not necessarily of uniform size. The total area of the grid apertures will depend primarily on the volume of the gases to be passed therethrough. Usually, it is desirable that the size of the apertures, and total cross-sectional area of the apertures, be sufficiently great to avoid a significant back pressure on the mixture passing therethrough. However, the size of the apertures should be sufficiently small to effect substantial disruption and a complete, thorough mixing of the preliminarily mixed fuel and oxidizing gas. We have found that by reducing the size of the apertures to a point where a significant back pressure is exerted, combustion is not substantially improved over that obtained where larger apertures and a greater total cross-sectional area of the apertures are used to avoid substantial back pressure, and in some cases the flame obtained is of a less desirable nature. We have, with advantage, constructed the grid of screen wire having one hundred square openings per square inch, the grid measuring 2–3 inches in diameter. However, in view of our present disclosure, optimum conditions can be determined by simple tests.

The apertures of the grid may be of irregular size and, if desired, may have a depth which is greater than their transverse dimension.

We have, with particular advantage, used a grid composed of, or containing, a material which is catalytic to the thermal decomposition or cracking of the fuel. We have, for example, used grids constructed of stainless steel containing nickel in the mixing of natural gas and air. It is well-known that nickel promotes the dehydrogenation of methane and other hydrocarbons to form substances such as hydrogen and modified hydrocarbon compounds which combine more readily with oxidants. Therefore, by the use of such grids, we have, in accordance with our present invention, promoted more efficient combustion of the fuel and thereby generating hot combustion gases of more uniform and more readily controlled composition. Numerous catalytic substances other than nickel are known to promote such reactions and may be incorporated in the grid in lieu of, or in conjunction with nickel, the choice and type depending primarily upon practicality of application and the type of fuel employed.

The invention will be further described and illustrated with reference to the accompanying drawings which represent preferred embodiments thereof, but it will be understood that the invention is not limited to the illustrated apparatus or operational limitations which may be implied therefrom.

FIG. 1 is a fragmentary, longitudinal sectional view of a carbon black furnace illustrative of the general type to which the present invention is applicable, FIG. 2 is a transverse sectional view along the line 2—2 of FIG. 1, FIG. 3 is a somewhat enlarged, more detailed sectional view of a fuel injector-grid assembly, and FIG. 4 is an end view of the assembly of FIG. 3.

In FIGS. 1 and 2, an elongated, cylindrical reaction chamber is represented at 1, the chamber being delineated by walls 2 of furnace refractory surrounded by thermal insulation 3 all encased in a metal jacket 4.

Entering the reaction chamber in a direction tangential to the inner walls at the upstream end thereof are two mixing chambers or tunnels 5 closed at their respective outer ends by chambers 6 to which air or other oxidizing gas is charged through conduits 7.

For brevity, we shall hereinafter refer to the oxidizing gas as "air," but it will be understood that the invention is not restricted to the use of air as the oxidizing gas, even though air is more commonly used for the purpose.

In FIG. 2, the air is shown as entering the chamber 6 in a radial direction. It will be understood, however, that the air may be charged to the chambers 6 in any other manner; for instance, it may be injected tangentially into the chambers, so as to form a swirling stream of air passing into and through the mixing conduits 5. In any event, the air passes through the conduits 5 toward the reaction chamber 1 and in passing therethrough is mixed with a fluid fuel, for instance natural gas, injected into the air stream through fuel conduit 8 to which there is secured a fuel injection nozzle 9.

In conventional operation, the resultant combustible mixture of the fuel gas and air would either be passed as such to the chamber 1 and be burned therein or else be partially or completely burned in the conduit 5 and the resultant hot products of combustion passed to the reaction chamber.

In accordance with our present invention, as previously described, we cause the combustible mixture to pass through a grid, such as more clearly shown in FIGS. 3 and 4, whereby a thorough, complete mixing of the fuel and air is effected prior to the burning.

In FIGS. 3 and 4, there is shown a grid constructed of screen wire represented at 10, clamped between two metal rings 11 and 12 by means of bolts, rivets or the like, indicated at 13. The grid assembly may be supported in the path of the combustible mixture by any suitable means, but, as shown, is secured to the inner end of the fuel conduit 8 by means of a coupling 14 and struts 15.

An advantage of the arrangement of the fuel injector-grid assembly shown is that it permits ready adjustment of the position of the grid within the mixing tunnel whereby the point of initiation of the combustible mixture may be controlled. This may be accomplished by releasing the friction clamps 16 and adjusting the position of the assembly by sliding fuel conduit 8 therethrough. By this means, the assembly may be positioned, for instance, as shown in solid lines in FIG. 2 or moved forward to a position indicated in broken lines, or may be adjusted to any point between those positions. In the illustrated apparatus, the diameter of the grid assembly is slightly less than the diameter of the tunnels 5 so as to permit free longitudinal movement of the grid within the tunnels.

The fuel injection nozzle 9 may be of any conventional type whereby the fluid fuel may be atomized or transformed into a diffused pattern and mixed with the air before reaching the grid. It is generally preferable to use a nozzle which projects the fuel in a manner which results in its being distributed over the entire area of the grid, but it is possible, in some instances, to use no nozzle at all, particularly if the fluid fuel is a gas and is discharged into the mixing conduit at low velocity.

The distance of the grid from the fuel injection nozzle or orifice is not critical, but preferably should be sufficient to permit the dispersing of the fluid fuel over the entire grid area. This will depend, of course, upon the type of fuel, the velocity at which the fuel is injected and the spread angle of the nozzle, where a nozzle is used.

As previously noted, instead of the screen wire grid shown in the drawings, the grid may be constructed of a perforated metal plate of sufficient thickness and rigidity as to require no supporting rings, in which case the plate may be secured directly to the struts 15 as by bolting or welding or may be otherwise supported in the mixing conduit.

In the apparatus illustrated, the hydrocarbon make is injected into the stream of hot combustion gases passing through chamber 1 by means of a coaxially positioned injector indicated at 17 extending through the upstream end wall of the furnace. The type of injector used is not critical and its choice will depend primarily upon the characteristics of the hydrocarbon make to be used. It may be of the two-fluid type, whereby atomization of the hydrocarbon make as it enters the furnace chamber is promoted by an atomizing fluid, or may be of the single fluid type whereby no atomizing medium is used. Usually, for this purpose, one will use an injection assembly which is protected from overheating, as by means of a water jacket.

In the apparatus illustrated, we have shown the hydrocarbon make injector of the type in which the fluid hydrocarbon is injected radially outwardly toward the delineating side wall of the furnace chamber, as more fully described in the U.S. Patent 3,046,095 of Heller et al. However, as previously noted, any suitable type of injector may be used, the hydrocarbon make being injected into the hot gas stream either coaxially with respect to the furnace chamber or may be injected radially inwardly into the furnace chamber.

In carrying out the operation in the apparatus shown, air at a predetermined and measured rate, is supplied to the mixing conduits 5 through the bustles 6 and supply conduits 7 to create relatively turbulent streams which flow toward the grids. Simultaneously a fluid fuel at a predetermined and measured rate is projected toward the grids from the discharge orifices 9 of conduits 8. Rather substantial mixing of the fluid fuel and the oxiding gas may occur before they reach the grids, but as they flow through the openings of the grid they are further commingled to form a uniform combustible mixture.

When the grids are positioned within the mixing chambers 5, ignition of the combustible mixture will occur therein just beyond the downstream face of the grids. The mixture may continue to burn within the reaction chamber 1, and since the mixing chambers discharge tangentially into chamber 1, a spinning body of highly heated gases is created therein.

A hydrocarbon make, such as a liquefied highly aromatic hydrocarbon of petroleum or coal tar, may be introduced into the interior of the reaction chamber through a water-cooled spray injector, as indicated at 17, which projects the hydrocarbon radially as droplets into the reaction chamber 1. Since the gases within the reaction chamber are highly heated, the hydrocarbon is converted to carbon black by thermal decomposition. After formation, the carbon black is conveyed from the furnace as an aerosol within the hot combustion gases, and the aerosol may be quenched and the carbon black separated and collected, as by conventional methods.

As previously noted, the invention has provided a number of outstanding advantages. By reason of our thorough, uniform mixing of the fuel and air, the effective range of proportions of the constituents of the combustible mixture may be extended and the uniformity and composition of the combustion gases nicely controlled, thereby controlling the quality and yield of the resultant furnace black.

For instance, where natural gas is used as the hydrocarbon fuel in some types of carbon black furnaces, it has heretofore been difficult to effect uniform and smooth-burning combustible mixtures of air and natural gas in proportions lower than about 11.5 standard cubic feet of air per standard cubic foot of the natural gas. In accordance with the present invention, we are able to effect smoothly-burning mixtures at proportions as low as 9 cubic feet of air per cubic foot of the natural gas.

A marked advantage in extending the range of proportions in which the fuel may be mixed with the oxidizing gas resides in the face, as indicated above, that control over the combustion of the hot gases is important with respect to regulation of the properties of the resultant carbon black. It has been recognized that the properties of the resultant carbon black, and particularly surface chemistry, will depend to a considerable extent upon whether the combustion gases, into which the hydrocarbon make is injected, are oxidizing, neutral or reducing, the reducing atmosphere also resulting in carbon blacks having lower oil absorption characteristics than result when the atmospheres is oxidizing. The present invention provides a method and means for more closely controlling the qualities of the black through control of the characteristics of the hot gas stream.

Accordingly, the range of proportions at which the fuel and oxidizing gas may be mixed without flash-back or explosion may be considerably broadend. We have also found that the combustion is more rapidly and efficiently accomplished, thus preventing the formation of coke within the fuel-mixing section of the furnace.

An even further advantage of the invention resides in the fact that the yield of carbon black obtained from a given quantity of hydrocarbon make may be increased by its utilization. With conventional mixing methods, commingling of the fuel and oxygen frequently is not sufficient to assure their complete interaction. We have found that proper employment of the grid assures a substantially complete combustion of the fuel and oxidizing gases within the combustion zone, which not only results in combustion gases having a higher temperature, but also greatly reduces the amount of undesirable oxygen present in the combustion gases, thereby essentially negating the reduction in carbon black yield which can result therefrom.

Use of the grids has also enabled us to produce carbon blacks which are more uniform in nature by permitting improved regulation and maintenance of desirable properties during the manufacturing process. We believe that this results from the creation of atmospheres of mixed gases within the combustion and reaction zones which are more thoroughly blended and uniform in temperature throughout, and which upon commingling with the hydrocarbon make, results in a pattern of transformation to carbon black that is unusually consistent in nature.

As a specific example of how grids may be utilized to advantage in such carbon black furnaces, we have in one case installed them within the cylindrical mixing chambers of a furnace, of the type shown, to overcome "rumbling" caused by repeated explositions. Before the grids were installed, combustion was ineffective to the extent that the fuel coked on the furnace wall and the yield of carbon black obtained from the feedstock hydrocarbon was not optimum.

The grids were installed in the furnace mixing chambers 4″ downstream from the fuel discharge orifice. The material from which the grids were constructed was a stainless steel alloy, having an appreciable content of nickel. The diameter of each grid was 2½″ and there were 100 square openings per square inch of grid cross-section. Each mixing chamber had a diameter of 3″ and air and natural gas were mixed therein at the rates of 14,600 s.c.f.h. and 1460 s.c.f.h., respectively.

Installation of the grids overcame the rumbling and eliminated fuel coking upon the furnace walls. Further, it was found that the carbon black yield from each gallon of hydrocarbon make was increased by .2 lb.

Although gaseous fuels have been repeatedly referred to herein, the use of liquid fuels such as hydrocarbon fuel oils, is also within the scope of this invention and they may be employed when due care is exercised to prevent coking upon grid and the furnace chamber walls.

Also, gaseous fuels other than hydrocarbon gases may be employed, hydrogen or carbon monoxide for example, and any oxidizing gas may be used with the fluid fuels, provided it can be formed into fuel mixtures which burn appropriately and provide combustion gases in which a fluid hydrocarbon feedstock may be thermally decomposed to form carbon black.

We claim:

1. Apparatus for producing carbon black by the thermal decomposition of hydrocarbons comprising an elongated heat-insulated reaction chamber, said chamber having an inlet end where reaction materials are introduced into the chamber and an outlet end where combustion gases and products of thermal decomposition are removed from the chamber, means positioned at the inlet end of said chamber for establishing and maintaining therein a turbulent flowing stream of hot combustion gases, means at said inlet end of said reaction chamber for separately injecting the hydrocarbon into said hot combustion gases, the first said means comprising at least one mixing conduit leading tangentially into the inlet end of said reaction chamber, means for preliminarily forming a stream of a combustible mixture of a fluid fuel and a free oxygen-containing gas in said conduit, a mixing grid positioned in the path of said stream and arranged as to effect uniform thorough mixing of said fluid fuel with substantially all of the free oxygen-containing gas and means for adjusting the position of said mixing grid in relation to the discharge outlet of the mixing conduit.

2. The apparatus of claim 1 further characterized in that the grid is positioned within the mixing conduit.

3. The apparatus of claim 1 further characterized in that the grid is positioned across the discharge outlet of the mixing chamber.

4. The apparatus of claim 1 further characterized in that the grid comprises a catalyst for the dehydrogenation of the fuel.

5. The apparatus of claim 4 further characterized in that the grid comprises nickel.

6. The apparatus of claim 5 further characterized in that the grid is constructed of stainless steel.

7. The apparatus of claim 1 further characterized in that the grid is constructed of screen wire of a fineness such that there are of the order of 100 square openings per square inch of grid area.

8. The apparatus of claim 1 further characterized in that the grid is a perforated metal plate.

References Cited
UNITED STATES PATENTS

| | | | |
|---|---|---|---|
| 1,269,676 | 6/1918 | Benson | 158—112 |
| 1,818,471 | 8/1931 | Geaugue | 158—111 X |
| 2,564,700 | 8/1951 | Krejci | 23—209.4 |
| 2,590,660 | 3/1952 | Skoog et al. | 23—259.5 |
| 2,618,540 | 11/1952 | Teti | 158—112 X |
| 2,641,534 | 6/1953 | Krejci | 23—209.4 |

OSCAR R. VERTIZ, *Primary Examiner.*

E. J. MEROS, *Assistant Examiner.*